United States Patent [19]

Moriya et al.

[11] Patent Number: 5,143,769
[45] Date of Patent: Sep. 1, 1992

[54] DEOXIDIZER SHEET

[75] Inventors: Takehiko Moriya, Tokyo; Toshio Komatsu, Ibaraki; Yoshiaki Inoue, Tokyo, all of Japan

[73] Assignee: Mitsubishi Gas Chemical Company, Inc., Tokyo, Japan

[21] Appl. No.: 407,426

[22] Filed: Sep. 14, 1989

[30] Foreign Application Priority Data

Sep. 22, 1988 [JP] Japan .................. 63-236218

[51] Int. Cl.$^5$ .................. A23L 3/3436; B32B 27/18; B65B 55/19; B65D 81/28
[52] U.S. Cl. .................. 428/76; 206/484.1; 252/188.28; 423/219; 426/133; 426/541; 428/283; 428/286; 428/311.1; 428/311.5; 428/319.1; 428/339; 428/340; 428/233; 428/242; 428/316.6
[58] Field of Search .................. 206/484.1; 423/219; 426/133, 541; 428/76, 283, 286, 311.1, 311.5, 316.6, 319.1, 339, 340, 233, 242; 252/188.28

[56] References Cited

U.S. PATENT DOCUMENTS 4,769,175 9/1988 Inoue .................. 252/188.28

FOREIGN PATENT DOCUMENTS 0206343 12/1986 European Pat. Off. .
534789 5/1976 Japan .
54-35189 3/1979 Japan .
57-170176 10/1982 Japan .

OTHER PUBLICATIONS

Etsuno et al., "Hydrophilic Filler-Containing Oxygen-Absorbing Polymer Compositions", Chemical Abstracts 110, 214415C, 1989.
Fujishima et al., "Packaging Laminates", Chemical Abstracts, 94, 31753t, 1981.

*Primary Examiner*—James C. Cannon
*Attorney, Agent, or Firm*—Leydig, Voit & Mayer

[57] ABSTRACT

A deoxidizer sheet suitable for preservation of goods such as foods is provided that has a first layer which essentially contains a deoxidation reaction main agent, such as mixture of iron powder and a metal halide, and a fixing material such as natural or synthetic fibers and heat-meltable resin fibers or powder. The deoxidizer sheet also has a pair of second layers heat-bonded to both surfaces of the first layer.

22 Claims, 1 Drawing Sheet

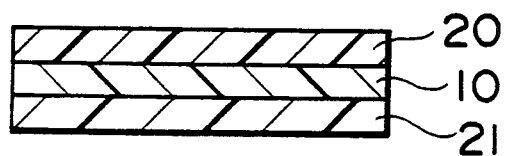
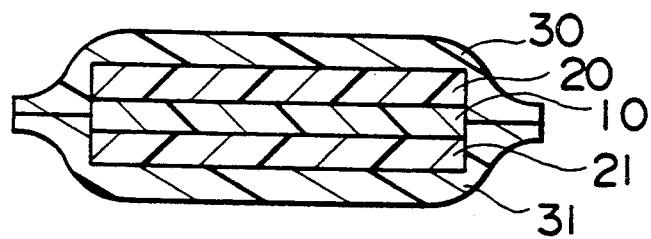
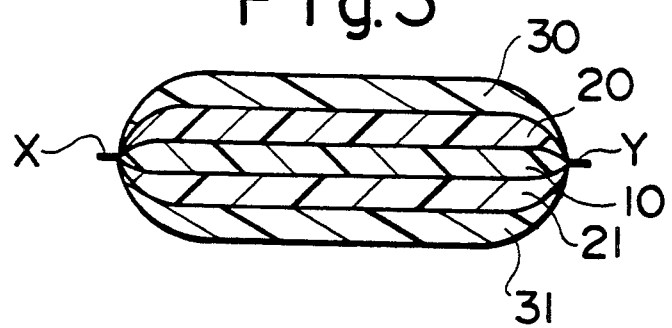

DEOXIDIZER SHEET

BACKGROUND OF THE INVENTION

1. Field of the Invention

The present invention relates to a deoxidizer in the form of a sheet (referred to as "deoxidizer sheet" hereinafter) for avoiding rottenness, degeneration or degradation of the foods.

2. Description of the Related Art

Deoxidizers are conveniently used in storing foods, particularly processed foods, because of their superior properties for preventing oxidation degradation, and generation of mildew and microaerobions.

Deoxidizers conventionally used for the purpose of storing foods are prepared in the form of powders or particles charged in small sacks made of air-permeable materials. A sack charged with the powder of a deoxidizer often has an appearance resembling that of a food package, causing a risk for the purchaser to dangerously eat the deoxidizer. A deoxidizer sack found in a mass of food sometimes imparts unpleasantness or suspicion to the purchaser. In addition, a sack of deoxidizer, when packaged together with foods in a package made of a gas-barrier material, impairs the appearance of the food package as a commercial product due to irregularity of the thickness of the sack.

Various sheet-type deoxidizers have been proposed to overcome the above-described problems of the deoxidizer sacks charged with powdered deoxidizers. For instance, Japanese Patent Unexamined Publication No. 54-114585 discloses a sheet-type deoxidizer formed by coating a sheet of a plastic or paper with a coating material in which a deoxidizer composition is blended. Japanese Patent Unexamined Publication No. 55-44344 discloses a sheet formed from a blend of a deoxidizer composition and a thermoplastic resin. A sheet-type deoxidizer disclosed in Japanese Patent Unexamined Publication No. 56-26524 is produced by forming a sheet from a blend of a deoxidizer composition and a foamable resin and then allowing the resin to foam. In Japanese Utility Model Unexamined Publication No. 60-10768, a deoxidizer composition is sprayed on an adhesive layer which coats a base sheet. Japanese Patent Unexamined Publication No. 55-106519 discloses a sheet-type deoxidizer which is formed by applying an adhesive to a fibrous sheet, dispersing a deoxidizer composition in the fibrous sheet, and bonding this fibrous sheet to another fibrous sheet to which the same adhesive is applied. Japanese Patent Unexamined Publication No. 55-109428 discloses a sheet-type deoxidizer having a deoxidizer layer composed of a porous layer with its pores filled with a deoxidizer composition.

These known sheet-type deoxidizers, however, suffer from various disadvantages. For instance, a sheet formed from a blend of a coating resin material and a deoxidizer composition, even when it is of foamed type, encounters a problem in that the oxygen absorption performance is limited so that the deoxidizing rate is small and oxygen absorption capacity is also small as compared with a conventional deoxidizer charged in a gas-permeable sack. The sheet-type deoxidizer produced by spraying a deoxidizer composition on an adhesive layer also is disadvantageous in that the oxygen absorption capacity per unit area is impractically small because of too small a quantity of composition carried by the adhesive layer. The sheet-type deoxidizer having a porous base sheet suffers from the following disadvantage, particularly when iron powder is used as the deoxidizer which fills the pores. Namely, the iron powder tends to be concentrated to the bottoms of the pores in the porous base sheet due to its large specific weight so that it is difficult to uniformly disperse the iron powder even if a fibrous sheet having mingling fibers such as a non-woven cloth is used as the porous base sheet. In addition, it is difficult to fix the deoxidizer composition in this type of sheet. For these reasons, problems are often experienced such as scattering of the deoxidizer powder from a cut edge of the sheet and easy separation of the outer film.

SUMMARY OF THE INVENTION

Accordingly, it is an object of the present invention to provide a deoxidizer sheet which has a high oxygen absorption rate and a large oxygen absorption capacity, while allowing a deoxidizer composition to be stably held in the sheet, thereby overcoming the above-described problems of the prior art.

To this end, according to the present invention, there is provided a deoxidizer sheet comprising: a first layer containing (a) a main deoxidation reaction agent essentially containing iron powder and a metal halide, and (b) a fixing member or material containing natural or synthetic fibers and heat-meltable fibers or a heat-meltable resin powder; and a pair of second layers between which said first layer is sandwiched and fixed by melting.

The main deoxidation reaction agent is a composition for absorbing oxygen, which essentially contains iron powder and a metal halide. The deoxidation reaction agent may be prepared in the form of a mere mixture of the iron powder and the metal halide with or without another component which is added as required. In order to attain a greater oxygen absorption activity, however, it is preferred that the main deoxidation reaction agent is prepared by coating particles of iron powder or particles of a mixture of iron powder and activated carbon with the metal halide, or by rubbing the metal halide into the surfaces of the particles of the iron powder or particles of mixture of iron powder and activated carbon.

The fixing material is a mixture of natural or synthetic fibers and heat-meltable fibers or heat-meltable resin powder.

Examples of the natural fibers usable as a component of the fixing material are cellulose fibers such as fibers obtained from wood pulp, cotton pulp, linen pulp, hemp pulp, paper mulberry, paper bush and Gampi, among which fibers obtained from wood pulps are used most suitably. Examples of the synthetic fibers suitably used are polyamides such as nylon and polyesters such as polyethylene terephthalate.

The heat-meltable fibers or heat-meltable resin powders are prepared from polyolefins such as polyethylene, polypropylene and ethylene-vinyl acetate copolymer (EVA), or from polyvinyl chloride. From the viewpoint of health and prevention of offensive smell, polyethylene and polypropylene are used preferably.

Each single fiber of the natural fibers, synthetic fibers and heat-meltable fibers used in the present invention preferably has a small width. Usually, the width of the elementary fiber is 50 $\mu$ or less, preferably 30° or less. The elementary fiber also has a length of 0.1 to 200 mm, preferably 0.5 to 20 mm.

The pair of second layers sandwich therebetween the first layer composed of the main deoxidation reaction agent and the fixing material. These second layers may be made from the same material or may be formed from different materials, in the form of gas-permeable sheets such as non-woven cloths, woven cloths and paper sheets. Examples of the materials of the second layers are polyolefins such as polyethylene and polypropylene, polyesters such as polyethylene terephthalate, or polyamides such as nylon. Rayon and pulps also are suitably used as the material of the second layers. The weight of the second layers preferably ranges between 10 g/m² and 100 g/m².

The first layer containing the main deoxidation reaction agent and the fixing material constitutes the intermediate layer of the deoxidizer sheet of the present invention. Preferably, the first layer as the intermediate layer, is formed by uniformly mixing the main deoxidation reaction agent and the fixing material, placing the uniform mixture between the pair of the second layers and applying heat and pressure to both second layers, so that a sheet structure having second layers bonded through the intermediary of the first layer is obtained. The bonding heating temperature and pressure vary according to the conditions such as the materials of the heat-meltable fibers or heat-meltable resin powder, material of the second layers and so forth. In general, however, the temperature and the pressure preferably range between 120° and 200° C. and between 0.2 and 2 kg/cm², respectively.

The ratio at which the aforementioned main reaction agent and the fixing material are mixed is determined in accordance with the oxygen absorption per unit area to be obtained. Usually, 50 to 1,000 weight parts, preferably 100 to 500 weight parts, of the main reaction agent (A) is used per 100 weight parts of the fixing material (B).

The ratio at which the natural or synthetic fibers and the heat-meltable fibers or heat-meltable resin powder are mixed varies depending on conditions such as the sheet formability and oxygen absorption rate to be obtained. In general, however, 100 to 1,000 weight parts, preferably 150 to 500 weight parts and more preferably 150 to 300 weight parts, of the heat-meltable fibers or heat-meltable resin powder is used per 100 weight parts of the natural or synthetic fibers.

The deoxidizer sheet having three layers thus formed can be used as an effective deoxidizer without any processing. The deoxidizer, however, may be processed in various manners as explained below. For instance, it is possible to add water to the deoxidizer sheet and to coat one or both of the second layers with a coating sheet or film. The deoxidizer sheet also may be packaged in a sack made of the coating material. The coating sheet or film may be made of one of the materials which are ordinarily used as a packaging or sack material of deoxidizers. For instance, one of the following materials 1) to 4) can suitably be used as the material of the coating material.

1) A laminate sheet composed of a paper sheet or a non-woven cloth and a porous film provided on one or both sides of the paper sheet or the non-woven cloth.

2) A laminate sheet composed of the above-mentioned laminate sheet and a network-like sheet such as warifu or a sheet of cloth provided on the above-mentioned laminate sheet or the non-woven cloth.

3) A water-proof non-woven cloth, synthetic paper or microporous film, or a laminate sheet or film composed of such a sheet or film and another gas-permeable film or sheet.

4) A laminate sheet composed of a non-porous film, a paper sheet or a non-woven cloth, and a porous heat-bondable film.

These coating materials may be used independently or, alternatively, a combination of two or more of these coating materials may be used. It is also possible to use these materials together with a sheet or film of a type other than mentioned above.

In a specific form of the present invention, the deoxidizer sheet, with the coating layers bonded thereto, is cut by melting along its peripheral edge so that the coating material covers the edge of the deoxidizer sheet thus providing a simple deoxidizer sheet.

In the deoxidizer sheet of the present invention, the main deoxidation reaction agent is suitably dispersed in the heat-meltable fibers or powder and also in the natural or synthetic fibers and is suitably integrated by the heat-meltable fibers or heat-meltable resin powder. Therefore, the molten resin does not impede the deoxidation performance of the deoxidizer sheet, so that a large deoxidation speed and a large oxygen absorption capacity can be attained.

The invention will be more fully understood from the following description of the preferred embodiments taken in conjunction with the accompanying drawings.

BRIEF DESCRIPTION OF THE DRAWINGS

FIG. 1 is a sectional view of an embodiment of the deoxidize sheet of the present invention;

FIG. 2 is a sectional view of another embodiment of the deoxidizer sheet having coating layers; and FIG. 3 is a sectional view of a further embodiment of the deoxidizer sheet produced by laminating a deoxidizer sheet and coating layers and then cutting the peripheral edge of the laminate structure by melting.

DESCRIPTION OF THE PREFERRED EMBODIMENTS

FIG. 1 shows a deoxidizer sheet embodying the present invention. This deoxidizer sheet has a first layer 10 containing a deoxidation reaction main agent and a fixing material, and a pair of second layers 20 and 21 bonded by application of heat and pressure to both sides of the first layer. The second layers 20 and 21 are made of the same material or from different materials.

FIG. 2 shows another embodiment of the present invention which is produced by covering both surfaces of the deoxidizer sheet of FIG. 1 with coating layers 30 and 31 which are made of the same material or different materials. The coating of the deoxidizer sheet with the coating layers may be effected after addition of water to the deoxidizer sheet. The construction shown in FIG. 2 is effective in preventing leakage of the content or component because the edges of the deoxidizer sheet are coated with the coating material. In order to further ensure prevention of leakage of the content, the peripheral edge of the deoxidizer sheet maybe sheared and then coated by resins in the form of adhesive or hot-melt resins.

FIG. 3 shows still another embodiment in which the first layer 10 containing the deoxidation reaction main agent and the fixing material is sandwiched between the pair of second layers 20 and 21 and the thus formed laminate structure is coated by a pair of coating layers 30 and 31, followed by cutting of the peripheral edges X and Y by heat-melting.

EXAMPLE 100 weight parts of iron powder were uniformly mixed with 1 weight part of activated carbon and 5 weight parts of 20% aqueous solution of sodium chloride were added to the mixture. As a result, heat was generated to evaporate water so that a dried powder was obtained. 100 weight parts of this dried powder was mixed with 10 weight parts of a wood pulp and 20 weight parts of polyethylene fiber. The thus formed mixture was sprayed onto a polyester non-woven cloth having a weight of 50 g/m$^2$ in amount of 200 g/m$^2$. Then, a polyester non-woven cloth having a weight of 20 g/m$^2$ was placed on the sprayed mixture, and the thus obtained sandwich-type structure was pressed by heat rolls from the upper and lower sides thereof at a temperature of 180° C. and a pressure of 0.2 kg/cm$^2$.

The thus obtained deoxidizer sheet was cut into square pieces each having four sides of 30 mm. Meanwhile, a pair of square packaging sheets each having four sides of 50 mm were prepared. The packaging sheet had a laminate structure composed of a paper sheet and porous films bonded to both surfaces of the paper sheet. More specifically, the packaging sheet has a laminated structure represented by L/M/N layers, where, L represents a film formed by laminating a polyethylene terephthalate film (12$\mu$) and a polyethylene film (15$\mu$) and forming pores of 0.5 mm diameter at a pitch of 1 mm in two orthogonal directions, M represents a Japanese paper having a weight of 40 g/m$^2$, and L represents a polyethylene (40$\mu$) having pores of 0.5 mm diameter formed at a pitch of 1 mm in two orthogonal directions. The above-mentioned piece of the deoxidizer sheet was sandwiched between the pair of packaging sheets and the thus obtained laminate structure was pressed between heat rolls so that a deoxidizer sheet was obtained.

The sheet deoxidizer thus obtained was left in a sealed system containing 50 ml of air having a relative humidity of 100% at a temperature of 25° C. The oxygen concentration in the sealed system was 0.1% or less when measured three days after the sealing.

As will be understood from the foregoing description, the deoxidizer sheet of the present invention exhibits a high oxygen absorption speed and a large oxygen absorption capacity by virtue of the fact that the molten resin does not impair oxygen absorption performance.

The pair of outer sheets effectively protect the first layer containing the main deoxidation reaction agent. It is also possible to coat this deoxidizer sheet with coating layers or to encase the same in a sack made from a coating material, so as to adapt the deoxidizer sheet to a variety of uses without impairing gas permeability.

The deoxidizer sheet of the present invention exhibits appreciable deoxidation effect without addition of water, provided that the food to be preserved has a large water content. If the food to be preserved has a small water content, it is advisable to drip water onto the surfaces of the deoxidizer sheet so as to uniformly wet the deoxidizer sheet so as to ensure high deoxidation effect on various types of foods including dried foods.

What is claimed is:

1. A deoxidizer sheet comprising:
  a first layer containing a mixture of
  (a) a deoxidation reaction main agent essentially containing iron powder and a metal halide, and
  (b) a fixing material containing natural or synthetic fibers and heat-meltable fibers or a heat-meltable resin powder; and
  a pair of second layers between which said first layer is sandwiched and fixed by heat-melting, whereby said heat-meltable fibers or resin powders are melted by heat melting and bind said main deoxidation reaction agent with said natural or synthetic fibers.

2. A deoxidizer sheet according to claim 1, wherein said metal halide is mixed with said iron powder.

3. A deoxidizer sheet according to claim 1, wherein said metal halide coats particles of said iron powder.

4. A deoxidizer sheet according to claim 1, wherein said metal halide is rubbed into the surfaces of particles of said iron powder.

5. A deoxidizer sheet according to claim 1, wherein said natural fibers are cellulose fibers.

6. A deoxidizer sheet according to claim 1, wherein said synthetic fibers are polyamide or polyester fibers.

7. A deoxidizer sheet according to claim 1, wherein said heat-meltable fibers or said heat-meltable resin powder are fiber or powder of a polyolefin or polyvinylchloride.

8. A deoxidizer sheet according to claim 1, wherein each of said fibers has a width not greater than about 50$\mu$ and a length of about 0.1 mm to about 200 mm.

9. A deoxidizer sheet according to claim 1, wherein each of said pair of second layers is gas-permeable and its weight is about 10 g/m$^2$ to about 100 g/m$^2$.

10. A deoxidizer sheet according to claim 9, wherein each layer of said pair of second layers are made of the same material or different materials.

11. A deoxidizer sheet according to claim 1, wherein said pair of second layers and said first layer interposed between said pair of second layers have been heat-bonded together at a temperature of about 120° C. to about 200° C. and at a pressure of about 0.2 kg/cm$^2$ to about 2 kg/cm$^2$.

12. A deoxidizer sheet according to claim 1, wherein the content of said main deoxidation reaction agent is about 50 to about 1000 weight parts per 100 weight parts of said fixing member.

13. A deoxidizer sheet according to claim 1, wherein the content of said heat-meltable fibers or said heat-meltable resin powder is about 100 to about 1,000 weight parts per 100 weight parts of said natural or synthetic fibers.

14. A deoxidizer sheet according to claim 1, further comprising a gas-permable coating material which coats the outer surface of at least one of said pair of second layers.

15. A deoxidizer sheet according to claim 14, wherein said coating material coats the outer surfaces of both of said pair of second layers so as to define the outermost layers of said deoxidizer sheet.

16. A deoxidizer sheet according to claim 14, wherein said coating material is shaped into the form of a sack which receives a laminated sheet composed of said first layer and said pair of second layers.

17. A deoxidizer sheet according to claim 14, wherein a laminated sheet composed of said first layer and said pair of second layers contains water added thereto.

18. A deoxidizer sheet according to claim 14, wherein said coating material comprises a sheet including a sheet of paper or non-woven cloth and a porous film adhered to at least one side of said sheet of paper or non-woven cloth.

19. A deoxidizer sheet according to claim 14, wherein said coating material comprises a sheet of a water-proof non-woven cloth or a synthetic paper or a porous film having fine pores.

20. A deoxidizer sheet according to claim 14, wherein said coating material comprises a laminate sheet having a non-porous film, a sheet of paper or a non-woven cloth, and a porous heat-bondable film.

21. A deoxidizer sheet according to claim 15, wherein the peripheral edge portion of said coating material bonded to both outer surfaces of said pair of second layers is cut by melting.

22. A deoxidizer sheet according to claim 1 wherein said main deoxidation reaction agent includes activated carbon.

* * * * *